United States Patent [19]

Barnert et al.

[11] 4,175,013
[45] Nov. 20, 1979

[54] METHOD OF GENERATING HYDROGEN AND OXYGEN FROM WATER

[75] Inventors: Heiko Barnert; Jiri Divisek; Wolfgang Faul, all of Jülich, Fed. Rep. of Germany

[73] Assignee: Kernforschungsanlage Jülich Gesellschaft mit beschränkter Haftung, Jülich, Fed. Rep. of Germany

[21] Appl. No.: 971,742

[22] Filed: Dec. 21, 1978

[30] Foreign Application Priority Data

Dec. 24, 1977 [DE] Fed. Rep. of Germany ....... 2758119

[51] Int. Cl.$^2$ .............................................. C25B 1/04
[52] U.S. Cl. ................................................. 204/129
[58] Field of Search ....................................... 204/129

[56] References Cited

U.S. PATENT DOCUMENTS 3,888,750   6/1975   Brecher et al. ................. 204/129

FOREIGN PATENT DOCUMENTS 2035558  12/1970  France .

OTHER PUBLICATIONS

"Thermochem. H$_2$ Production at Lawrence Livermore Lab.", by R. G. Hickman et al., U. of Calif., Livermore, 1974.

Primary Examiner—R. L. Andrews
Attorney, Agent, or Firm—Karl F. Ross

[57] ABSTRACT

A method of generating oxygen and hydrogen from water in which an acidic electrolyte containing formaldehyde is electrolyzed and produces oxygen and a gas which contains a low molecular-weight hydrocarbon. The low molecular-weight hydrocarbon is subjected to a catalytic conversion with water to produce synthesis gas consisting predominantly of hydrogen and carbon monoxide which are reacted to yield methanol. The methanol, in turn, is reacted to produce formaldehyde which is introduced into the electrolysis itself and hydrogen which is recovered.

9 Claims, 1 Drawing Figure

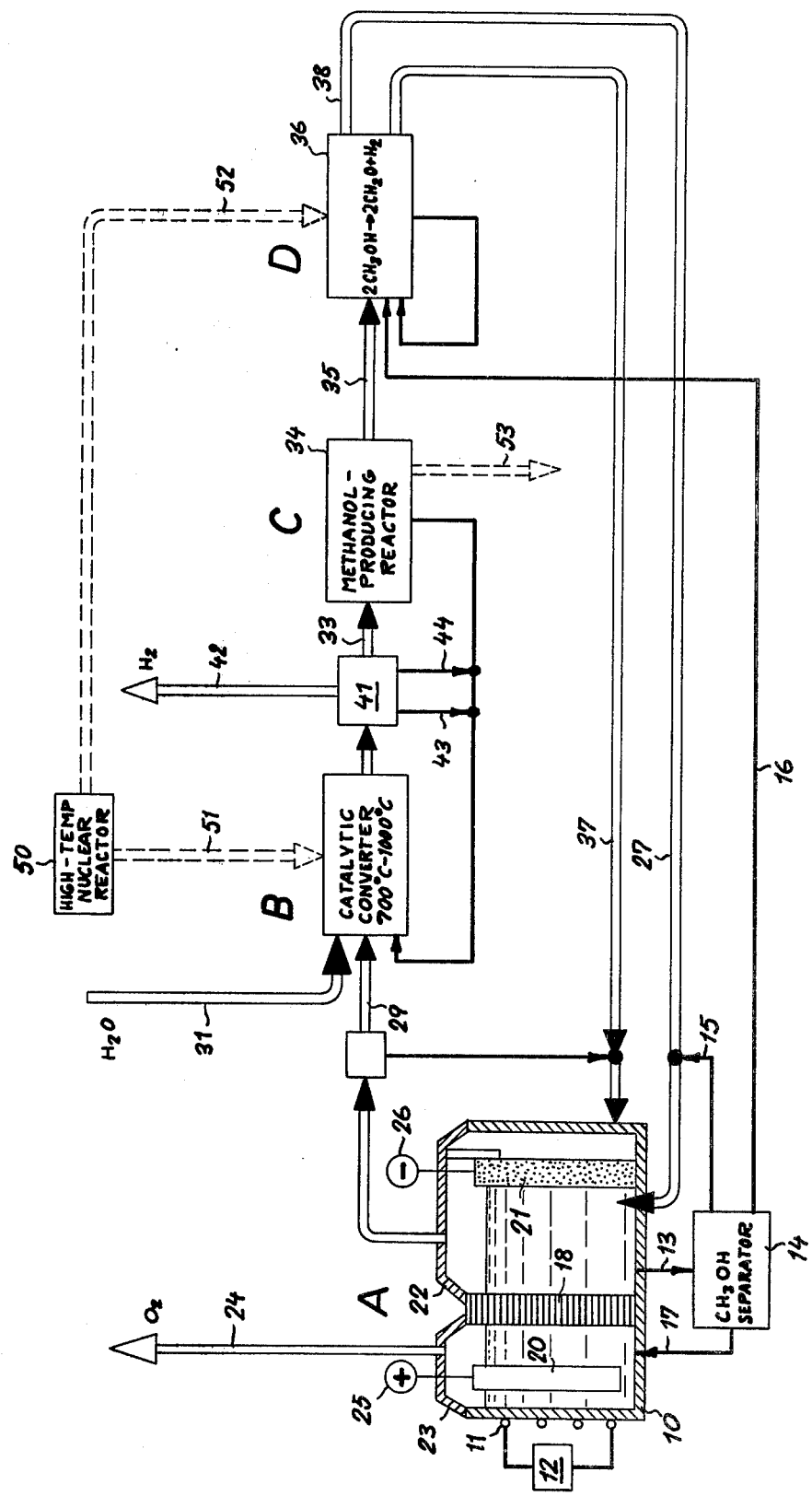

METHOD OF GENERATING HYDROGEN AND OXYGEN FROM WATER

FIELD OF THE INVENTION

The present invention relates to a method of generating hydrogen and oxygen from water by the splitting of water in a thermochemical cyclical process whereby hydrocarbons are generated and reacted as intermediates.

BACKGROUND OF THE INVENTION

Hydrogen is highly desired as a secondary energy carrier and as a chemical raw material for many purposes. For example, it is desirable as a raw material for the production of synthetic resins, for the direct reduction of iron ore and for many other industrial and chemical manufacturing processes.

It has been found to be especially desirable to recover hydrogen from thermal energy which can be produced, for example, by a nuclear reactor. This has the advantage that a pure electrolysis of water need not be employed with its high consumption of electrical energy.

Processes for the generation of hydrogen are, of course, known using cyclical thermal processes. For example, U.S. Pat. No. 3,888,750 describes a process which is known as the sulfuric acid hybrid process. In this conventional process there are a number of process steps which require the supplying of thermal energy at high temperatures, for example for the vaporization of sulfuric acid and the thermal decomposition thereof to produce sulfur trioxide which can be further reacted to give sulfur dioxide and oxygen.

It is, of course, disadvantageous to use, as intermediates in the process, sulfur trioxide and sulfur dioxide since the latter have highly corrosive properties and are detrimental to the environment. Furthermore, the generation of oxygen by this technique requires especially high temperatures which create problems with respect to the materials from which the reactors are constituted.

In a publication entitled *Development of Thermochemical Water Splitting for Hydrogen Production*, at General Atomic Co., G.A-A, 14150, Sept. 30, 1976, page 20, Russell, McCorkle, J. H. Norman, J. R. Schuster, and P. W. Trester, describe a so-called sulfuric acid-iodine process in which apart from the vaporization of sulfuric acid and the splitting of sulfur trioxide, it is also necessary to decompose hydrogen iodide to produce the hydrogen. In this conventional process, the additional disadvantage arises that the use of hydrogen iodide requires special materials for the reactors in which the latter is handled.

U.S. Pat. No. 3,842,164 describes a process which utilizes the iron-chlorine system and in which compounds of iron, chlorine, oxygen and hydrogen, for example iron II and iron III oxides, iron II chloride, iron III chloride and hydrogen chloride are the reaction intermediates. In this process, oxygen also generated at extremely high temperatures and problems have been encountered in attempts to carry out the process on an industrial scale since several of the reaction intermediates are in the form of solids, thereby creating problems in the continuous feed and transport of the solids. Even intermittent or alternating feed of solids is a problem in this sense.

An additional disadvantage of the system of U.S. Pat. No. 3,842,164 is that several of the reaction intermediates are highly corrosive at high temperatures and produce or are compounds, e.g. chlorine, which are environmentally detrimental. Still another process for the generation of hydrogen has been described by R. G. Hickman, O. H. Krikorian and W. J. Ramsey in the Thermochemical Hydrogen Producetion Research at Lawrence Livermore Laboratory, The Hydrogen Economy, Miami Energy (THEME) Conference, 18–20 March 1974, Miami Beach, Fla., pages 11–23, 11–30 and 11–31 of the conference proceedings. This process is described as the methane-methanol-arsenic oxide process. In this process it is also disadvantageous that reaction intermediates are used which form as solids and are environmentally detrimental.

Apart from the processes described above, mention should also be made of the calcium-bromine-mercury process which is described in French Pat. No. 2,035,558. Even in this process the reaction intermediates include mercury and compounds thereof which are either solids and/or are detrimental to the environment if released thereto.

Naturally, a description of the processes known in the art for producing hydrogen and water by electrolysis in a practical manner would not be complete without mention of simple electrolysis. But this process, as has been noted, uses large quantities of electricity which may not be readily available in many instances, especially in the present state of world energy shortages.

OBJECT OF THE INVENTION

It is, therefore, the principal object of the present invention to provide a method of or a process for the generation of hydrogen and oxygen from water in which the reaction intermediates are not of a solid state and are not chemically aggressive, in which the oxygen can be made available at relatively low temperatures and thus highly economically even for industrial scale production, and in whcih a major portion of the energy supplied to the system can be purely thermal energy.

SUMMARY OF THE INVENTION

This object and others which will become apparent hereinafter are attained, in accordance with the present invention, by a process for the splitting of water into hydrogen and oxygen (this being the net result) which comprises the combination of the following steps:

(a) With the supply of electrical energy in an electrolysis cell containing an electrolyte at a pH of 0 to 5 and consisting primarily of water, 1 to 30% by weight of formaldehyde is electrolyzed at a temperature of 50° to 200° C. cathodically to hydrocarbons of low molecular weight (especially methane and ethane) and water being anodically oxidized to oxygen and the resulting oxygen-containing gas or pure oxygen being recovered separately with methanol being separated out of the electrolysis solution, i.e. the electrolyte.

(b) The gaseous hydrocarbon is then recovered from the electrolyte solution and by conventional catalytic conversion in the presence of water, with the supply of thermal energy (i.e. endothermically) reacted at a temperature of 700° to 1000° C. to produce synthesis gas. From the synthesis gas, a portion of the hydrogen is recovered by any conventional method, preferably liquefaction or adsorption, the remaining synthesis gas containing hydrgen and carbon monoxide in a volume ratio of 2:1 being supplied to the next stage.

(c) The synthesis gas thus recovered is subjected to an exothermic reaction also using conventional techniques, at a temperature of 250° to 350° C. to methanol.

(d) The methanol recovered from the electrolyte and the methanol recovered from step (c) are reacted endothermically, i.e. with the supply of thermal energy, at a temperature of 500° to 700° C. to yield formaldehyde and hydrogen which are separated from one another.

(e) The formaldehyde recovered in step (d) is recycled to step (a).

Step (a) can be carried out in two different variants, in accordance with the present invention.

In the first variant, the reduction of formaldehyde and the oxidation of water to oxygen with the generation of methane is effected in accordance with the overall reaction:

$$CH_2O + H_2O \rightarrow CH_4 + O_2$$

In this variant water is consumed.

In the second variant, in accordance with the present invention, the reaction utilizes hydrogen which may be supplied to the cathode compartment in accordance with the equation:

$$CH_2O + H_2 \rightarrow CH_4 + \tfrac{1}{2}O_2$$

In the latter case a small part of the hydrogen produced in the system is utilized to reduce formaldehyde.

The first variant is particularly advantageous since, when steps (b) through (d) are considered, practically twice the quantity of hydrogen and oxygen is generated. This advantage, however, is at the expense of a greater utilization of electrical energy. The advantage of the second variant is that a reduced quantity of relatively expensive electrical energy is utilized. In practice it is found that neither variant occurs to the exclusion of the other and that a combination of both variants is usually observed, the balance between the two being established by the operating parameters of the electrolytic cell in step (a).

The reaction products of step (a) include in addition to low molecular weight hydrocarbons, expecially methane but also ethane and hydrogen in the cathode compartment, some methanol which is recovered from the electrolyte and is delivered, as previously indicated, after separation from the electrolyte, to step (d).

The production of synthesis gas in accordance with step (b) of the invention is carried out at high temperature by the supply of thermal energy in accordance with the principal reaction scheme:

$$H_2O + CH_4 \rightarrow CO + 3H_2$$

This reaction also has been found to produce carbon dioxide and is seldom complete so that the reaction mixture leaving the catalytic converter of step (b) is found to contain hydrogen, carbon monoxide, the carbon dioxide just mentioned and residual hydrocarbons. The residual hydrocarbons can be returned to the catalytic converter while the carbon dioxide can be likewise recycled to the catalytic converter as an oxygen carrier.

From the synthesis gas, a portion of the hydrogen is recovered as product hydrogen aso as to adjust the volume ratio of hydrogen to carbon monoxide to 2:1.

The thermal energy supplied to the catalytic converter is preferably derived from a high temperature nuclear reactor, any heat exchange technique being used for this purpose.

In step (c) a conventional methanol synthesis is carried out. The synthesis gas is thus brought into contact with any conventional methanol-producing catalyst, e.g. a copper catalyst, the byproducts in addition to methanol being, for example, dimethyl ether which can be recovered and in a conventional manner fed back to step (b) for conversion to additional quantities of hydrogen and carbon monoxide.

The heat generated in this reaction can be coupled to any of the heat-consuming stages of the process by suitable heat exchangers.

In step (d), the methanol is converted again by conventional techniques to formaldehyde and hydrogen. The methanol supplied to step (d) can include the methanol derived from the synthesis gas reaction as well as the methanol recovered from the electrolyte.

Contrary to the conventional processes, however, the reaction heat is not generated by a partial oxidation but rather is supplied by the primary heat source or by the exothermic phases of the reaction.

When the reaction is carried out in the manner described, the reaction intermediates are simple or lower hydrocarbons with up to five carbon atoms in the molecule, methanol and formaldehyde as well as carbon monoxide. At the temperatures at which the reaction steps are effected, none of these intermediates have any significant chemical aggressivity and thus fairly ordinary materials can be used for the reactors.

The reaction intermediates are only in fluid, i.e. gas or liquid form, or in solution, and do not pose any danger to the environment nor do they create problems with the handling of solids.

It is also a significant advantage that in the reaction scheme of the present invention, the oxygen is generated in industrial quantities at relatively low temperatures so that no problem is encountered with respect to the materials used in the reactors because of high temperature oxygen corrosion.

The reaction intermediates can be supplied as needed from external sources to compensate for any losses during the process.

According to an advantageous variant of the process according to the invention, the electrode is externally or internally sparged with hydrogen gas during the reduction of formaldehyde. The hydrogen is in part reduced and thus conserves electrical energy. With respect to the electrochemical process, therefore, a highly satisfactory energy balance can be obtained. When hydrogen is forced through the electrode, naturally, the latter may be porous, i.e. a so-called gas electrode.

In a further advantageous variant of the process according to the present invention, the formaldehyde is reduced in step (a) in an electrolyte which is an aqueous solution of the pH of about 1. It has been found that this solution should contain 2 to 3% by weight of formaldehyde and that the temperature should be about 100° C. in this variant.

BRIEF DESCRIPTION OF THE DRAWING

The above and other objects, features and advantages of the present invention will become more readily apparent from the following description, reference being made to the accompanying drawing, the sole FIGURE of which is a flow diagram illustrating the process of the present invention, in the second variant.

SPECIFIC DESCRIPTION

In the drawing, we have shown an electrolysis cell 10 which is divided into two electrolysis compartments by a fritted-glass or sintered-glass porous separator 18, a Rainey platinum porous electrode 21, i.e. a so-called gas electrode, being provided in the cathode compartment while an inert electrode, e.g. of ordinary platinum, is provided at 20 in the anode compartment.

The electrolysis cell 10 is provided with a circulating water temperature regulator represented by the coils 11 and the thermostatically controlled circulator 12. The circulator 12 regulates the temperature of the electrolyte so that it is always maintained between 50° and 200° C.

The cathode 21 is connected to the negative terminal 26 of a direct current source whose positive terminal 25 is connected to the anode 20. The cathode 21, which is the so-called gas-electrode, is supplied with the gas hydrogen from the compartment 28.

Electrolyte may be continously withdrawn from this cell, e.g. via line 13, and passed into a separator 14. The separation can be effected by distillation. The thermal energy for the distillation may derive from some exothermic reaction stage of the invention. The electrolyte, freed from the methanol, is returned to the cell as represented at 15. The byproduct methanol is given to the reactor 36 via line 16, surplus water is returned to the cell via line 17.

A hood 23 is provided over the anode compartment to recover the oxygen via line 24 as product oxygen. The oxygen may be compressed or liquefied and used for any desired purpose.

Formaldehyde is supplied to the electrolyte via line 27 and a suitable valve.

A hood 22 of the cathode compartment recovers the hydrocarbon-containing gas which may, for example, consist of methane, ethane and unreacted hydrogen.

The gaseous product from the cathode compartment is, after separation of the unreacted hydrogen, which is delivered to the feed line 37 for returning to the cell, delivered via line 29 to the catalytic converter 30 to which water is also supplied at 31, the catalytic converter being maintained at a temperature of 700° to 1000° C. by thermal energy supplied as represented by the heat-flow arrow 51 from the high-temperature nuclear reactor 50.

The gas recovered from the converter 30 contains hydrogen and carbon monoxide in addition to byproducts such as carbon dioxide and unreacted components such as methane. The carbon dioxide is separated as shown at 43 and the methane is separated as shown at 44 in a separator 41 from which product hydrogen can be recovered at 42 so that the gas delivered at 33 is a true synthesis gas containing 2 volumes hydrogen for each volume of carbon monoxide.

The carbon dioxide and methane may be returned to the catalytic converter 30.

The methanol-producing reactor 34 receives the synthesis gas and produces methanol by an exothermic reaction, a portion of the evolved heat being delivered as represented by arrow 53 to other steps of the overall process, e.g. production of steam.

The product recovered from reactor 34, after separation out of byproducts which can be recycled to the catalytic converter 30, is delivered as methane 35 to reactor 36 which converts methanol to formaldehyde and hydrogen. The product hydrogen is recovered as shown at 37 to the gas electrode 21 to effect reduction of formaldehyde as described previously. The formaldehyde recovered from the reactor 36 is discharged at 38 and is supplied via line 27 to the electrolysis cell 10. The reactor 36 also receives methanol from the line 16 previously described.

In the drawing, the portions identified at A, B, C and D, of course, represent steps (a), (b), (c) and (d) previously discussed.

SPECIFIC EXAMPLES

Examples given below deal exclusively with step (a) of the process in as much as the other steps may use conventional techniques as described.

EXAMPLE 1

In an electrochemical cell in which the temperature is maintained by water circulation and which is subdivided into two electrode compartments by a fritted-glass separator, the electrolyte is introduced. The electrode compartments each have a capacity of 50 ml and the cathode compartment is provided with a bubbler device, which represents the gas compartment 28, for sparging the surface of the electrode 21 which is constituted of Raney platinum, a material with an especially low hydrogen over voltage.

The effective area of the cathode 21 is 2 cm$^2$.

The electrolyte is constituted of an aqueous 0.1 molar sulfuric acid solution to which formaldehyde is added until the formaldehyde concentration is 0.5 molar. Formaldehyde may be continuously added to the electrolyte to maintain this concentration. The temperature of the electrolyte is maintained at about 80° C. and the cathode is sparged with nitrogen.

With a cathode potential of $-44$ mV against a normal hydrogen electrode and over an electrolysis period of 10 minutes, with a current of 3.75 A, 0.217 ml of methane at standard temperature and pressure is produced as determined by gas chromatography. Other possible products such as methanol and hydrogen were not found and the current efficiency with respect to the formation of methane was found to be practically 100%.

Similar results were obtained as to current efficiency over the full potential range from $+200$ mV against the normal hydrogen electrode to $-50$ mV against a normal hydrogen electrode.

EXAMPLE 2

In the system described in Example 1, a 1 molar sulfuric acid solution was used as the electrolyte and the temperature was 98° C. With the cathode set at a potential of $+36$ mV against a normal hydrogen electrode, 5 cm$^3$ of a 35% formaldehyde solution (aqueous) was supplied and a current of 9 mA was developed. Gas chromatographic analysis of the gases in the cathode compartment showed a composition of 40 volume percent ethane, 40 volume percent methane and 20 volume percent hydrogen.

EXAMPLE 3

In the electrolysis cell of Example 1 using a rotating disk electrode of platinum, a formaldehyde sulfuric acid electrolyte containing 0.1 molar sulfuric acid and 0.5 molar formaldehyde, was reacted. The current as well as the cathode potential were measured while the cathode was selectively sparged with nitrogen and hydrogen. It was found that the potential curve, with sparging with hydrogen gave higher positive values and thereby shifted the electrical energy utilization to more satisfactory potentials. With a current density of about 7.4 mA/cm$^2$, the shift was about 150 mV.

In Examples 1 and 2 oxygen was produced from the anode compartment in electrically equivalent amounts.

The hydrocarbon-containing gases from the cathode compartments are subjected to catalytic conversion and practically fully transformed into hydrogen and carbon monoxide from which product hydrogen was recovered. The resulting synthesis gas with hydrogen amd carbon monoxide in a volume ratio of 2:1 was reacted to produce methanol with substantially 100% conversion in a copper-containing methanol-producing reactor. The methanol was practically fully transformed to formaldehyde which was recycled to the electrolyte in each case. In the formladehyde-producing reaction product hydrogen was obtained in chemically equivalent quantities.

We claim:

1. A method of generating hydrogen and oxygen from water by decomposing water, said method comprising the steps, in combination, of:
   (a) electrolyzing an aqueous electrolyte containing 1 to 30% by weight of formaldehyde and having a pH of about 0 to 5 at a temperature of about 50° to 200° C. to produce hydrocarbon gases at a cathode and oxygen at an anode;
   (b) converting said hydrocarbon gases and water, while supplying thermal energy, at a temperature of about 700° to 1000° C. to produce a gas stream rich in hydrogen and carbon monoxide;
   (c) in an endothermic reaction with abstraction of thermal energy and at a temperature of 250° to 350° C., transforming the gas rich in hydrogen and carbon monoxide to methanol;
   (d) transforming the methanol produced in step (c) to formaldehyde and hydrogen and separating the formaldehyde from the hydrogen, the transformation of the methanol to the formaldehyde and hydrogen being effected at a temperature of about 500° to 700° C. with the supply of thermal energy; and
   (e) feeding the formaldehyde recovered in step (d) to step (a) for electrolysis in said electrolyte.

2. The method defined in claim 1 wherein the cathode during the electrolysis is sparged with hydrogen in step (a).

3. The method defined in claim 1 wherein the pH of the electrolyte is about 1 in step (a).

4. The method defined in claim 1 wherein the electrolyte is a 2 to 3% concentration of formaldehyde in step (a).

5. The method defined in claim 1 wherein the reaction temperature in the electrolysis of step (a) is about 100° C.

6. The method defined in claim 1 wherein methanol is produced in the electrolyte in step (a), said method further comprising the step of recovering methanol from the electrolyte and transforming the methanol recovered from the electrolyte to formaldehyde in step (d).

7. The method defined in claim 6 wherein the gases produced in step (b) are subjected to separation and product hydrogen is removed therefrom along with carbon dioxide and unreacted hydrocarbon to leave a synthesis gas containing 2 parts by volume hydrogen and 1 part by volume carbon monoxide.

8. The method defined in claim 7 wherein the carbon dioxide and unreacted hydrocarbon are recycled to the conversion in step (b).

9. The method defined in claim 8 wherein the heat required in steps (b) and (d) is supplied at least in part by a high temperature nuclear reactor.

* * * * *